(12) United States Patent
Stankus et al.

(10) Patent No.: US 8,567,016 B2
(45) Date of Patent: Oct. 29, 2013

(54) SPLICE TUBE WITH WEDGE RETAINING CAPS

(75) Inventors: John C. Stankus, Canonsburg, PA (US); John G. Oldsen, Butler, PA (US); Demrey G. Brandon, Pittsburgh, PA (US); John Daniel Feyrer, Pittsburgh, PA (US); Dakota Donald Faulkner, New Kensington, PA (US)

(73) Assignee: FCI Holdings Delaware, Inc., Wilmington, DE (US)

( * ) Notice: Subject to any disclaimer, the term of this patent is extended or adjusted under 35 U.S.C. 154(b) by 555 days.

(21) Appl. No.: 12/851,000

(22) Filed: Aug. 5, 2010

(65) Prior Publication Data

US 2012/0034038 A1   Feb. 9, 2012

(51) Int. Cl.
*F16G 11/04*   (2006.01)
(52) U.S. Cl.
USPC .................... 24/136 R; 403/374.1; 403/409.1; 405/302.2

(58) Field of Classification Search
USPC .......... 24/136 R; 403/211, 284, 374.1, 409.1, 403/314, 304; 405/302.2
See application file for complete search history.

(56) References Cited

U.S. PATENT DOCUMENTS

| 5,238,329 | A | 8/1993 | Long et al. |
| 5,913,641 | A | 6/1999 | Long |
| 5,913,940 | A | 6/1999 | Erikson et al. |
| 5,967,703 | A | 10/1999 | Stankus et al. |
| 7,118,310 | B2 | 10/2006 | Wallstein et al. |
| 7,384,216 | B2 | 6/2008 | Wallstein et al. |
| 7,717,650 | B2 | 5/2010 | Reschke et al. |

*Primary Examiner* — Robert J Sandy
(74) *Attorney, Agent, or Firm* — The Webb Law Firm

(57) ABSTRACT

A splice tube includes a body, first and second wedge assemblies, first and second plugs, and a securing member that secures at least one of the first and second plugs to the body. The body defines first and second passageways that extend through the body. Each passageway of the body has a first end and a second end. The first and second wedge assemblies each have a passageway. At least a portion of the first and second wedge assemblies are positioned within the first and second passageways, respectively. The first and second plugs are at least partially positioned within the passageway of the first and second wedge assemblies, respectively.

17 Claims, 9 Drawing Sheets

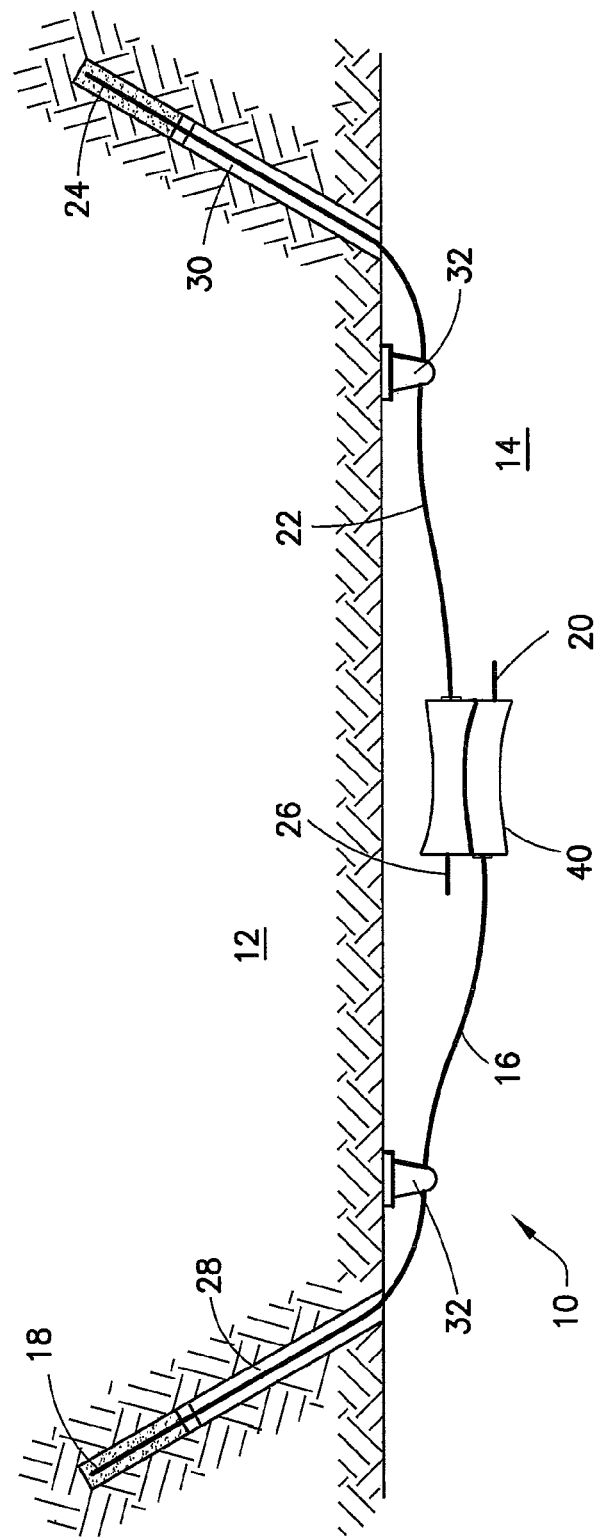

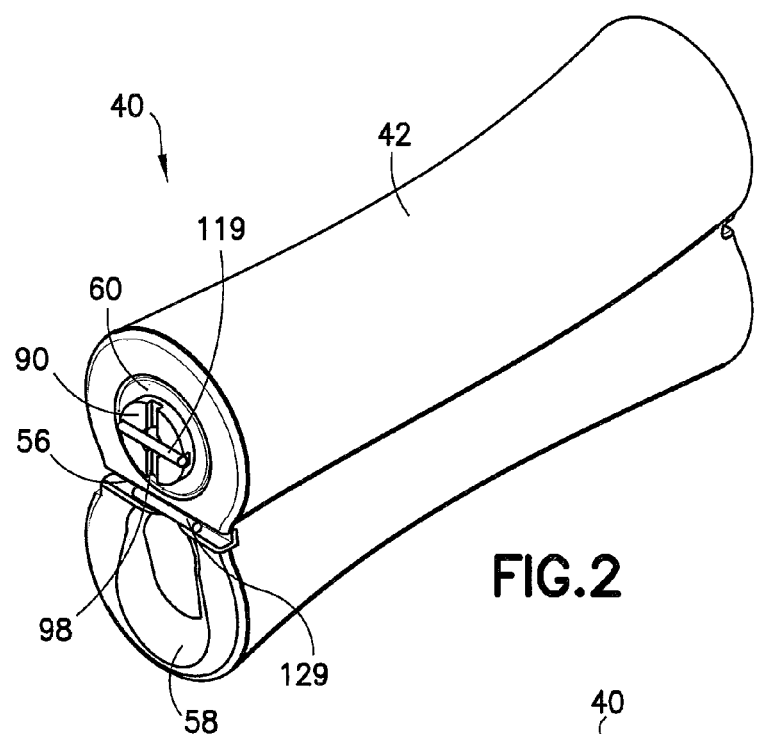
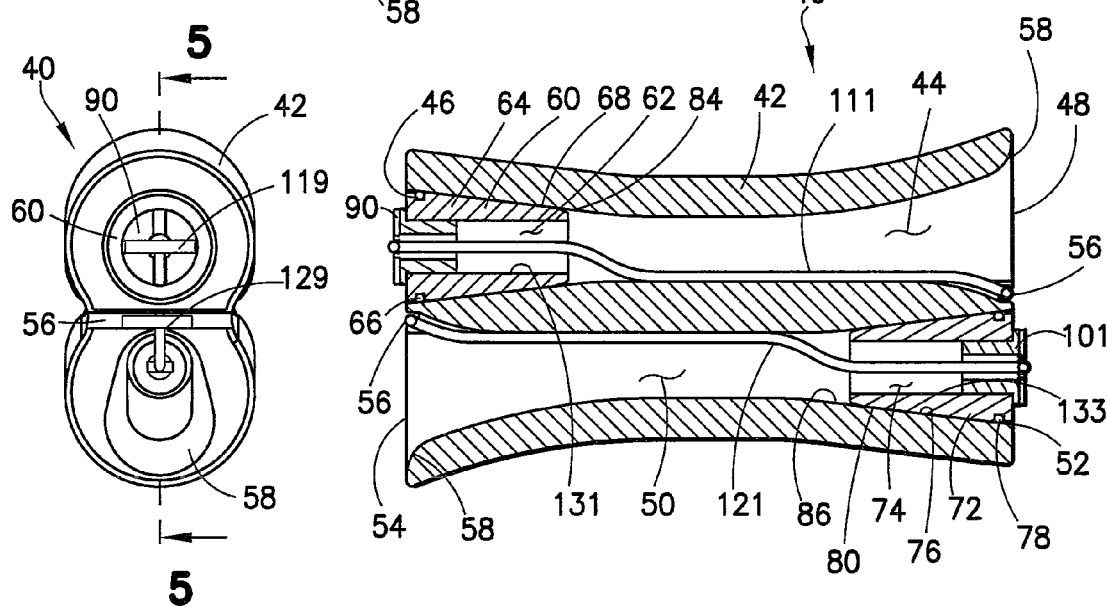

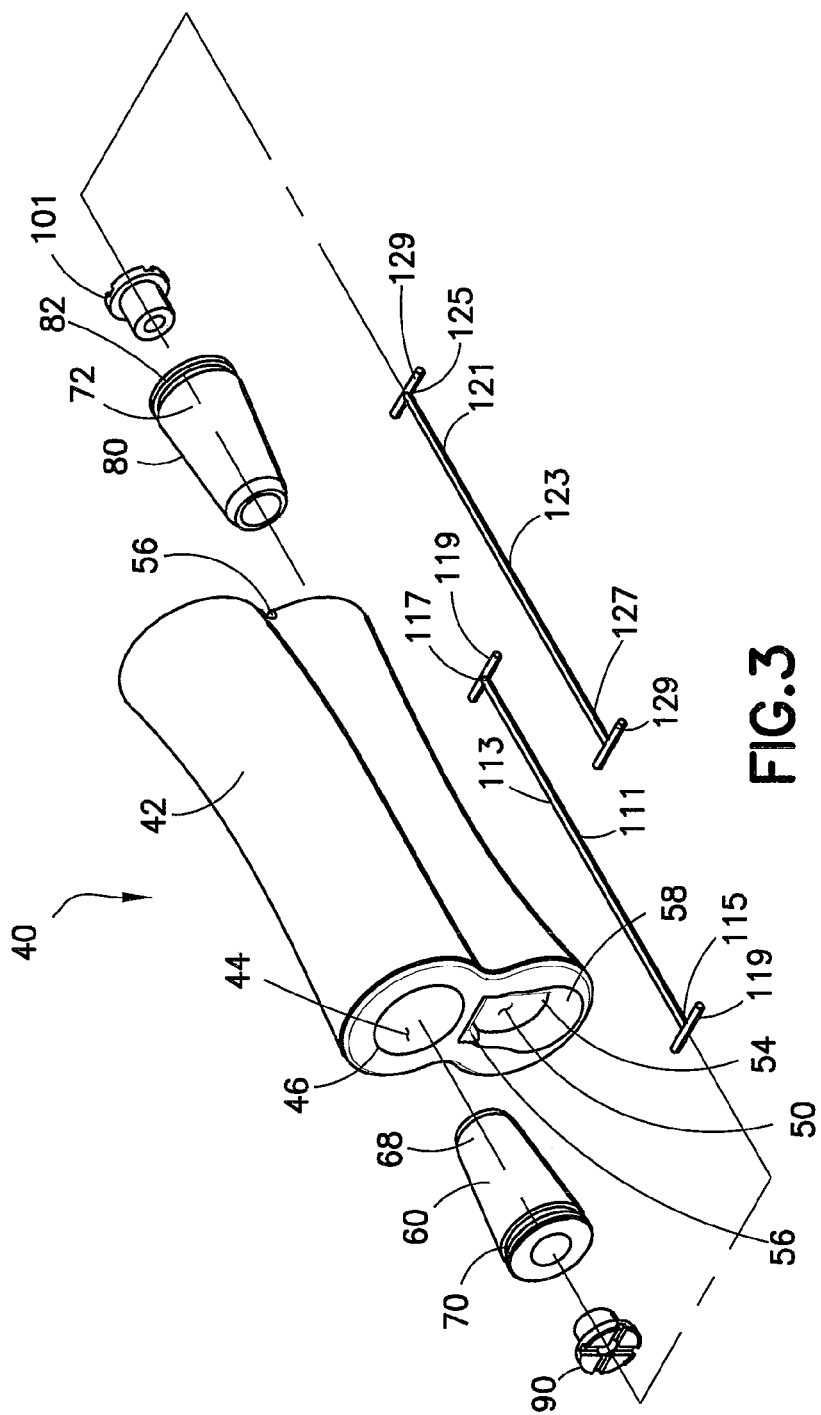

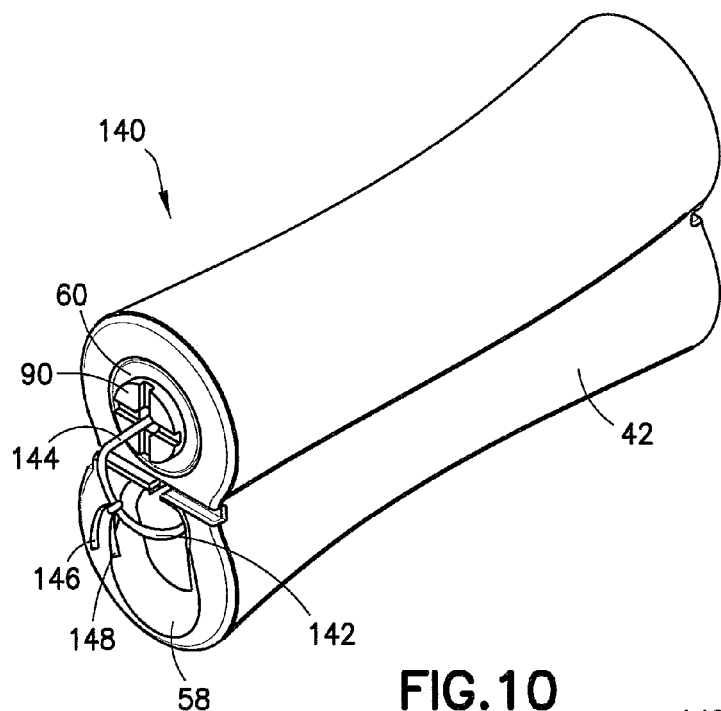
FIG.10
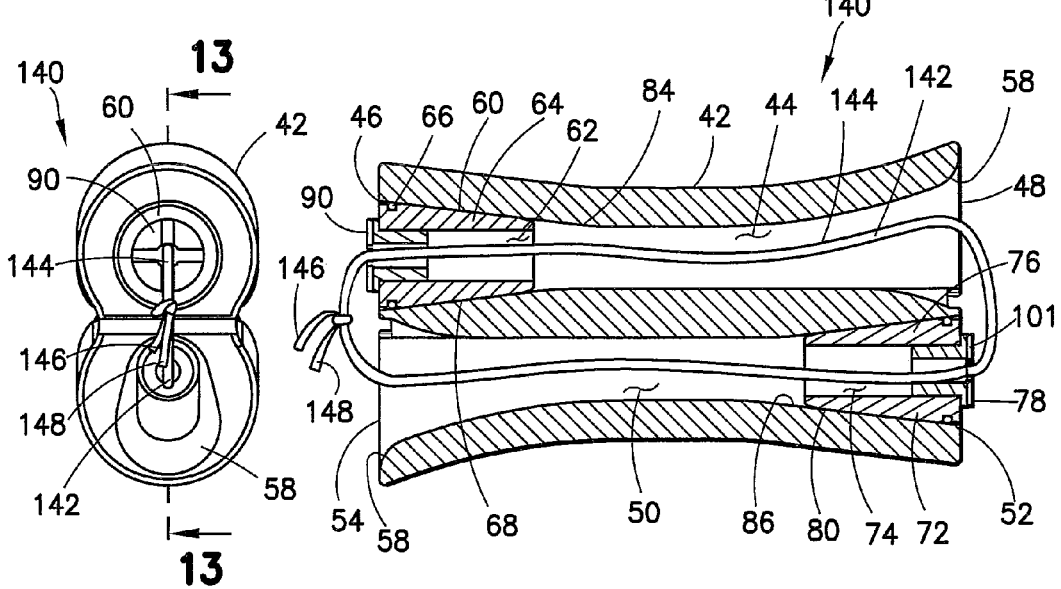
FIG.12                    FIG.13

SPLICE TUBE WITH WEDGE RETAINING CAPS

BACKGROUND OF THE INVENTION

1. Field of the Invention

The present invention relates to a splice tube for joining cables under tension and, more particularly, to a splice tube used in a cable truss system.

2. Description of Related Art

Roof trusses or roof support systems for mines provide support for the immediate roof strata. One type of roof support system utilizes a flexible cable extending between rigid rock anchors or bolts. The cable truss includes two boreholes spaced from each other with a cable bolt secured within each of the boreholes. A leading end of each cable bolt is secured within the borehole with a trailing end extending from the borehole. A splice tube couples the trailing end of each cable. The splice tube generally includes two passageways extending through the tube, although certain truss systems utilize rectangular tubing with one passageway. Each trailing end of the cables is pulled through the passageways in opposite directions and the cable bolts are then tensioned. Wedges are positioned in the passageways next to the cables. As the cables are released and drawn backwards, the wedges are moved further into the passageways and grip the cables thereby securing the cables relative to the splice tube. In certain designs, the passageways are curved to reduce sharp edges and prevent loads from being concentrated in a particular area.

With the cable truss system described above, the wedges are typically positioned next to the cables in the passageway by a worker. The wedges may be misplaced or dropped during the installation, which may require additional time to locate the wedges or additional cost in procuring extra wedges.

U.S. Pat. No. 7,384,216 discloses a cable coupler with a wedge assembly having a clip attached to the body of the coupler adjacent the passageways extending through the body. The clip is shiftable between a closed position in which the clip is positioned to prevent an adjacent wedge assembly from exiting the corresponding passageway and an open position in which the adjacent wedge assembly is insertable into the corresponding passageway. Further, a plug may be disposed within the wedge assembly to maintain the wedges slightly apart from each other and assist in holding the wedge assembly in a position to receive the cable.

SUMMARY OF THE INVENTION

In one embodiment, a splice tube includes a body, first and second wedge assemblies, first and second plugs, and a securing member that secures at least one of the first and second plugs to the body. The body defines first and second passageways that extend through the body. Each passageway of the body has a first end and a second end. The first and second wedge assemblies each have a passageway. At least a portion of the first and second wedge assemblies are positioned within the first and second passageways, respectively. The first and second plugs are at least partially positioned within the respective passageway of the first and second wedge assemblies.

The securing member may engage the first and second plugs and the body thereby securing the position of the first and second plugs and the first and second wedge assemblies relative to the body. The securing member may be a flexible wire having first and second ends, where the first end of the flexible wire extends through a passageway defined in the first plug, through the passageway of the first wedge assembly and the first passageway of the body, and further extending through a passageway defined in the second plug, through the passageway of the second wedge assembly and the second passageway of the body and being secured to the second end of the flexible wire. The first and second passageways of the body may each include a tapered portion, and each of the wedge assemblies may have a tapered surface configured to engage the tapered portion of the first and second passageways. The wedge assemblies may each include a plurality of wedge pieces and a resilient member securing the wedge pieces to a position adjacent each other. An outer surface of the wedge assemblies may define an annular groove with the resilient member being positioned within the annular groove.

Each of the plugs may include a plug body having a passageway extending therethrough and a flange extending radially outward from the plug body. The flange may be configured to engage an outer surface of the wedge assemblies. The body may also define a groove positioned adjacent to the second end of the first passageway of the body. Further, in one embodiment, the securing member may include a resilient body having a first end and a second end with the first and second ends of the resilient body each having a cross member secured thereto. The securing member may extend through the first passageway of the body with the cross member of the first end engaging the first plug and the cross member of the second end engaging the groove defined in the body. The securing member may bias the first plug and the first wedge assembly from the first end of the body passageway towards the second end of the body passageway. Further, the flange of the first plug defines a slot and the cross member of the first end of the resilient body may engage the slot of the flange.

In a further embodiment, a method of securing wedge assemblies within a splice tube includes: inserting a wedge assembly at least partially within a passageway defined by a splice tube; inserting a plug at least partially within a passageway defined by the wedge; and securing the plug to the splice tube with a securing member.

The securing member may include a first end and a second end with the plug being secured to the splice tube by inserting the first end of the securing member through a passageway defined in the plug, through the passageway of the wedge assembly and the passageway of the splice tube, and being secured to the second end of the securing member. Alternatively, the securing member may include first and second ends that each have a cross member secured thereto. The plug and wedge assembly may be secured relative to the splice tube by inserting the securing member through the passageway of the splice tube with the cross member of the first end engaging the plug and the cross member of the second end engaging a groove defined by the splice tube. The method may further include biasing the plug and the wedge assembly within the passageway of the splice tube via the securing member, and may include removing the plug from the passageway of the wedge assembly by inserting a cable through the passageway of the splice tube and engaging the plug.

BRIEF DESCRIPTION OF THE DRAWINGS

FIG. 1 is a schematic view of a splice tube assembly according to one embodiment of the present invention, showing the splice tube assembly in a cable truss system;

FIG. 2 is a perspective view of the splice tube assembly shown in FIG. 1;

FIG. 3 is an exploded perspective view of the splice tube assembly shown in FIG. 1;

FIG. 4 is a side view of the splice tube assembly shown in FIG. 1;

FIG. 5 is a cross-sectional view of the splice tube assembly shown in FIG. 1;

FIG. 10 is a perspective view of a splice tube assembly according to a further embodiment of the present invention;

FIG. 12 is a side view of the splice tube assembly shown in FIG. 10;

FIG. 13 is a cross-sectional view of the splice tube assembly shown in FIG. 10;

DESCRIPTION OF THE PREFERRED EMBODIMENTS

Figure 6:
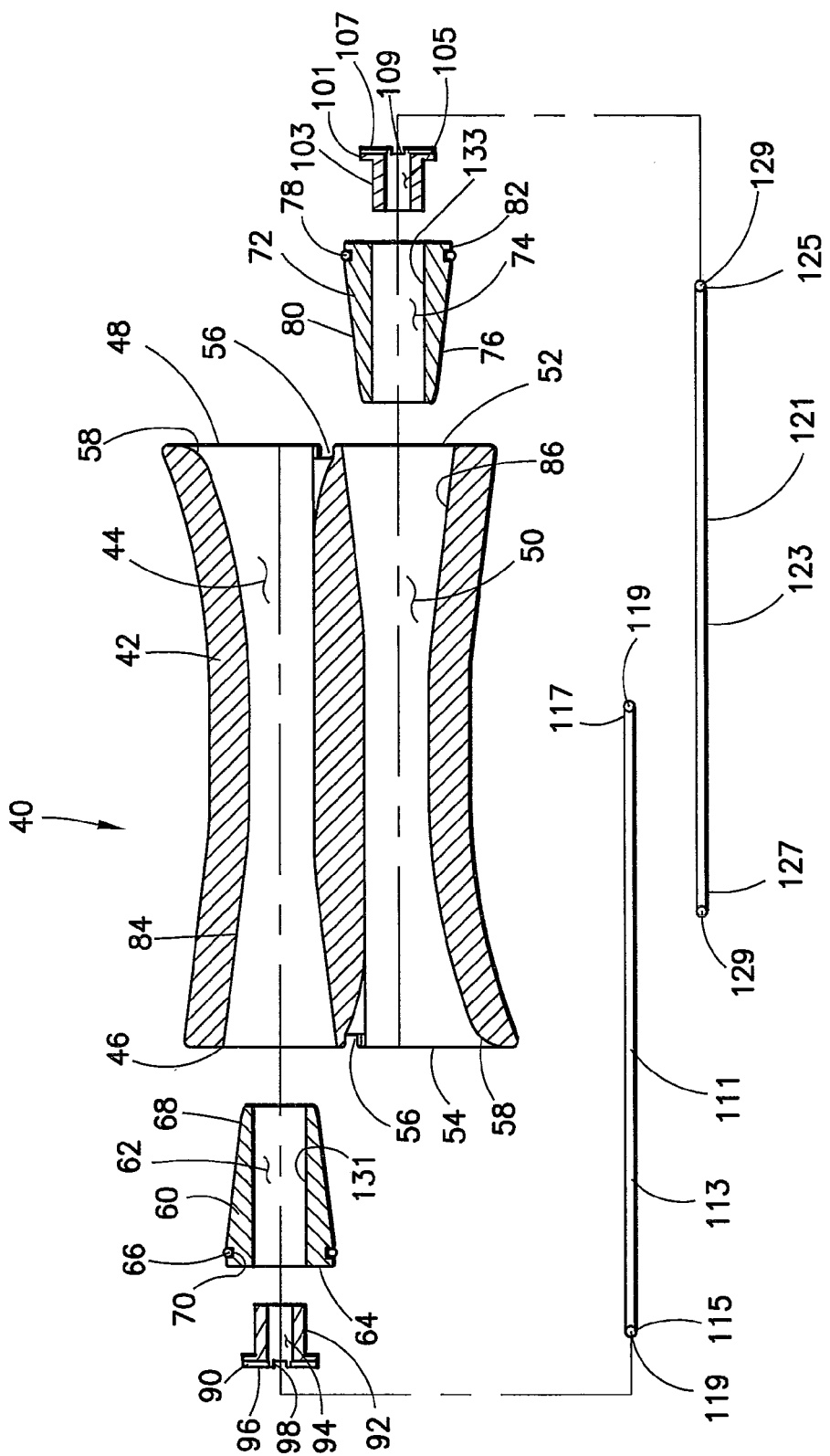
FIG. 6 is an exploded cross-sectional view of the splice tube assembly shown in FIG. 1.

The present invention will now be described with reference to the accompanying figures. For purposes of the description hereinafter, the terms "upper", "lower", "right", "left", "vertical", "horizontal", "top", "bottom" and derivatives thereof shall relate to the invention as it is oriented in the drawing figures. However, it is to be understood that the invention may assume various alternative variations and step sequences, except where expressly specified to the contrary. It is to be understood that the specific apparatus illustrated in the attached figures and described in the following specification is simply an exemplary embodiment of the present invention. Hence, specific dimensions and other physical characteristics related to the embodiments disclosed herein are not to be considered as limiting.

Referring to FIG. 1, a cable truss system 10 for supporting roof strata 12 of a mine opening 14 includes a first cable 16 having first and second ends 18, 20 and a second cable 22 having first and second ends 24, 26. Each cable 16, 22 may be formed of a multi-strand cable having a center or king stand and six peripheral helically wound strands surround the king strand, although other types of cables may be utilized. First and second boreholes 28, 30 extend vertically into the roof strata 12 or at an angle into the roof strata 12 (as shown in FIG. 1). The first end 18 of the first cable 16 is secured within the first borehole 28 via resin and/or mechanical anchoring as known in the art. The first cable 16 extends through a roof support plate 32, which is held against the roof strata 12 by the cable truss system 10 between the spaced boreholes 28, 30. The first end 24 of the second cable 22 is secured within the second borehole 30 via resin and/or mechanical anchoring as known in the art. The second cable 22 also extends through a roof support plate 32. The second ends 20, 26 of the first and second cables 16, 22 are received by a splice tube assembly 40. As discussed in more detail below, the splice tube assembly 40 joins the first and second cables 16, 22 thereby allowing the cables 16, 22 to be tensioned and the support plates 32 to be secured against the roof. In FIG. 1, the cable truss system 10 is shown prior to fully tensioning the first and second cables 16, 22. Furthermore, although FIG. 1 shows a single splice tube assembly 40 joining two cables 16, 22, the truss system 10 may include two splice tube assemblies 40 secured to the first and second cables 16, 22, respectively, with a third cable (not shown) secured to and extending between the two splice tube assemblies 40.

Referring to FIGS. 2-6, the splice tube assembly 40 includes a body 42 that defines a first passageway 44 and a second passageway 50. The first and second passageways 44, 50 extend through the body 42. Each passageway 44, 50 has a respective first end 46, 52 and a respective second end 48, 54. The body 42 also defines a groove 56 positioned adjacent the second end 48 of the first passageway 44 of the body 42 and a groove 56 positioned adjacent the second end 54 of the second passageway 50. Further, the body 42 defines a relief 58 positioned adjacent the second end 48 of the first passageway 44 of the body 42 and a relief 58 positioned adjacent the second end 54 of the second passageway 50. The splice tube assembly 40 further includes first and second wedge assemblies 60, 72 each having a passageway 62, 74 extending through the respective wedge assemblies 60, 72. The wedge assemblies 60, 72 are positioned within the first and second passageways 44, 50, respectively. Although the wedge assemblies 60, 72 are shown to be positioned entirely within the first and second passageways 44, 50, only a portion of the wedge assemblies 60, 72 may be positioned within the first and second passageways 44, 50. First and second plugs 90, 101 are positioned within respective passageways 62, 74 of the first and second wedge assemblies 60, 72. Further, the splice tube assembly 40 includes a pair of securing members 111, 121 that secure the first and second plugs 90, 101 to the body 42.

The first and second wedge assemblies 60, 72 each include wedge pieces 64, 76 and a resilient member 66, 78 securing the wedge pieces 64, 76 together. Each resilient member 66, 78 may be a spring clip or any other suitable member, such as an O-ring made of rubber. When the respective wedge pieces 64, 76 are together, each wedge assembly 60, 72 generally defines a frustoconical shape having a tapered outer surface 68, 80. The outer surface 68, 80 of each of the first and second wedge assemblies 60, 72 defines an annular groove 70, 82 that receives the resilient member 66, 78. The wedge assemblies 60, 72 are three-piece wedge assemblies, although other suitable wedge assemblies, such as a two-piece wedge assembly, may also be used. The first and second passageways 44, 50 of the body 42 each include a tapered portion 84, 86 that is shaped and configured to engage the tapered surface 68, 80 of the respective wedge assemblies 60, 72.

Figures 8, 9:
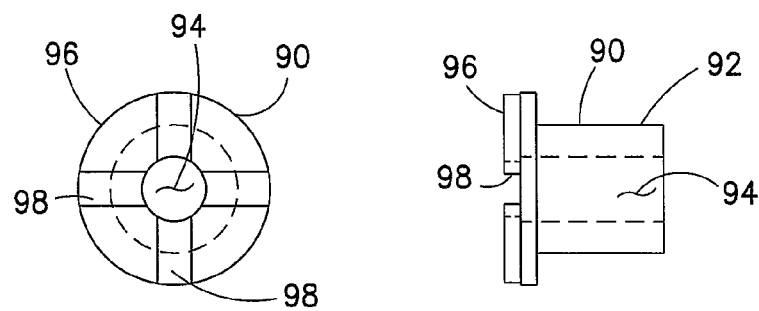
FIG. 8 is a front view of a wedge plug according to one embodiment of the present invention.
FIG. 9 is a side view of the wedge plug shown in FIG. 8.
Figure 11:
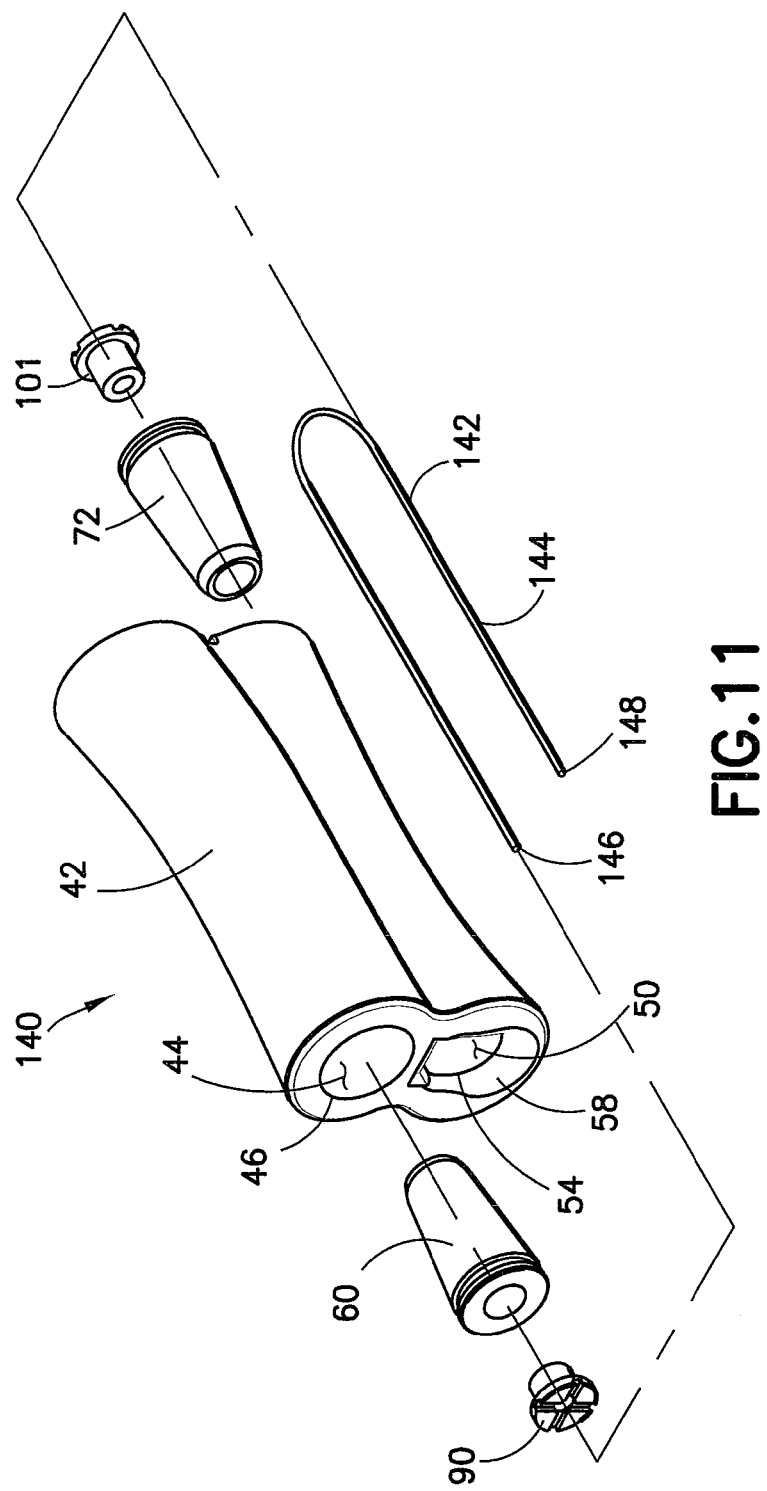
FIG. 11 is an exploded perspective view of the splice tube assembly shown in FIG. 10.
Figure 14:
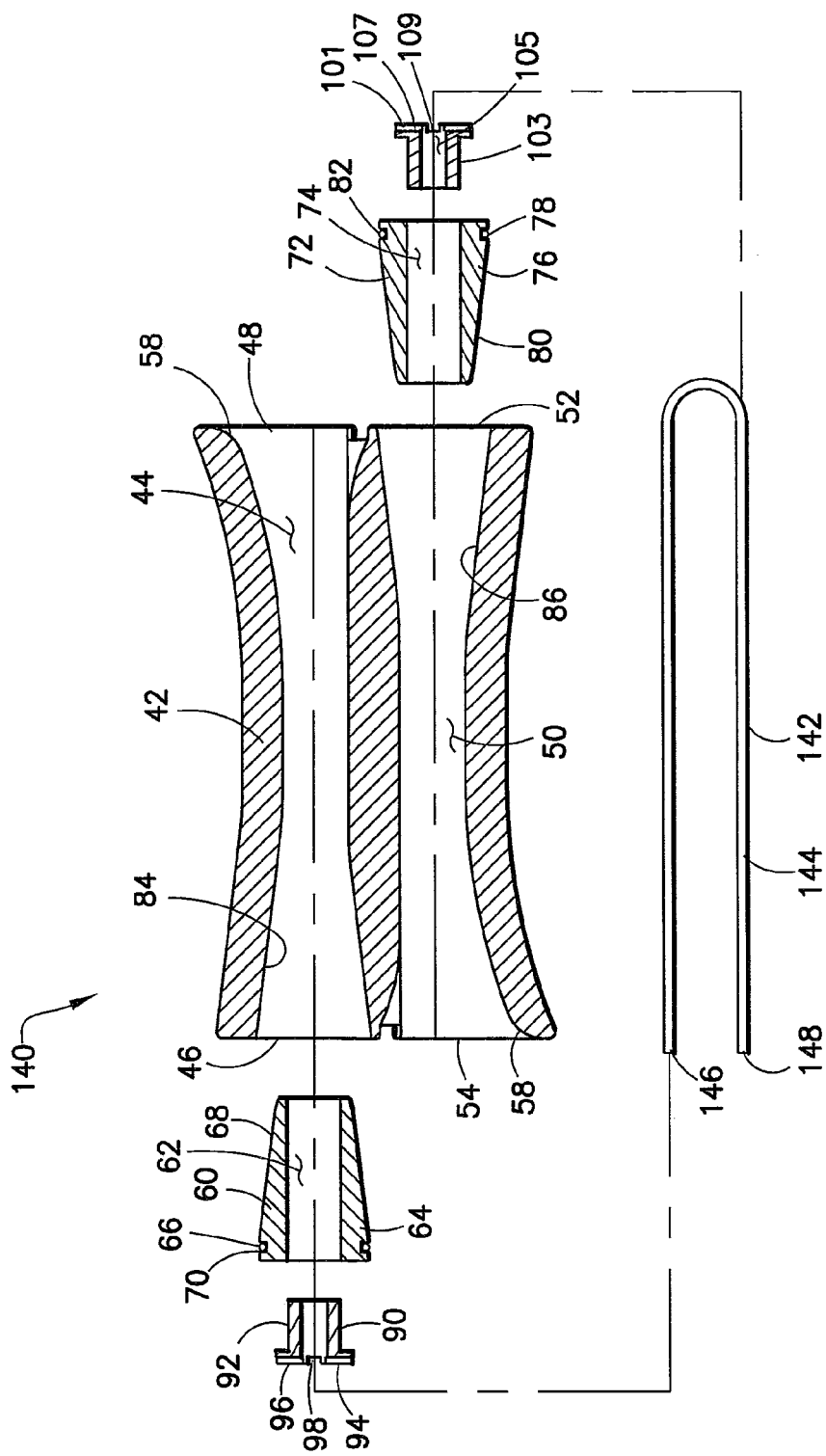
FIG. 14 is an exploded cross-sectional view of the splice tube assembly shown in FIG. 10.

Referring to FIGS. 6, 8, and 9, each plug 90, 101 includes a plug body 92, 103 having a passageway 94, 105 extending therethrough and a flange 96, 107 extending radially outward from the plug body 92, 103. The flange 96, 107 is configured to engage the end of the wedge assemblies 60, 72. Further, the flange 96, 107 of each plug 90, 101 defines a pair of slots 98, 109 that are arranged at an angle to each other, such as perpendicularly to each other, although one slot or more than two slots may be used.

Referring again to FIGS. 3 and 6, each securing member 111, 121 includes a resilient body 113, 123 having a first end 115, 125 and a second end 117, 127. The first 115, 125 and second ends 117, 127 of the resilient body 113, 123 each have cross member 119, 129 secured thereto. The resilient body 113, 123 may be made from an elastic material such as rubber or any other suitable material.

Referring again to FIGS. 2, 4, and 5, when the splice tube assembly 40 is assembled, the first wedge assembly 60 is positioned within the first passageway 44 of the body 42 adjacent to the first end 46 of the first passageway 44 with the tapered surface 68 of the first wedge assembly 60 engaging the tapered portion 84 of the first passageway 44. The first plug 90 is positioned within the passageway 62 of the first wedge assembly 60. The plug 90 may be configured to maintain a minimum diameter of the passageway 62 of the first wedge assembly 60. In particular, the plug 90 may maintain the wedge pieces 64 at a distance from each other with the resilient member 66 of the wedge assembly 60 biasing the wedge pieces 64 against the plug 90. The securing member 111 extends through the first passageway 44 of the body 42. The cross member 119 provided on the first end 115 of the securing member 111 engages one of the slots 98 of the flange 96 of the first plug 90 and the cross member 119 provided on the second end 117 of the securing member 111 engages the groove 56 of the body 42 positioned adjacent the second end 48 of the first passageway 44. Thus, the resilient body 113 of the securing member 111 extends from one cross member 119 through the first passageway 44 of the body 42 to the other cross member 119. The securing member 111 biases the first plug 90 and the first wedge assembly 60 in a direction extending from the first end 46 of the first passageway 44 towards the second end 48 of the first passageway 44. In particular, the securing member 111 has an unbiased length that is shorter than the length of the first passageway 44 of the body 42 such that the resilient body 113 of the securing member 111 is stretched upon engaging the first plug 90 and engaging the groove 56 positioned adjacent the second end 48 of the first passageway 44 with the respective cross members 119. The second wedge assembly 72, second plug 101, and second securing member 121 are positioned and secured within the second passageway 50 of the body 42 adjacent to the first end 52 of the second passageway 50 in the same manner described above in connection with the first wedge assembly 60 and first plug 90. Other arrangements for securing the ends 115, 117, 125, 127 to respective plugs 90, 101 may also be employed, such as hook and eye arrangements or the like.

Figure 7:
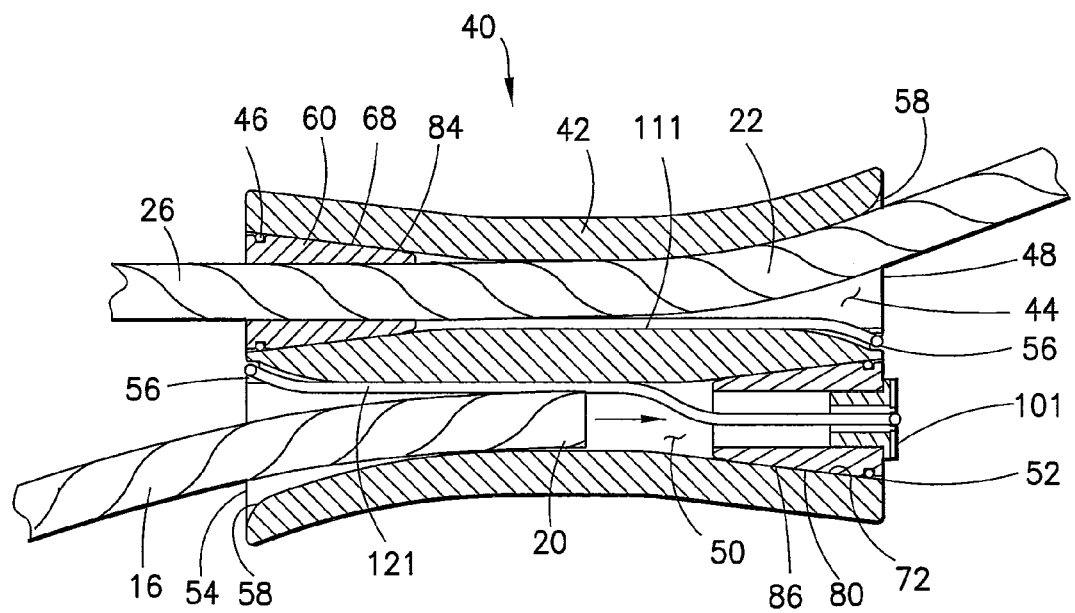
FIG. 7 is a cross-sectional view of the splice tube assembly shown in FIG. 1, showing the splice tube assembly with cables installed.

Referring to FIG. 7, the first cable 16 is shown being inserted into the second passageway 50 and the second cable 22 is shown extending through the first passageway 44. Although described below with reference to the first cable 16, the first and second cables 16, 22 are installed within the splice tube 40 in the same manner. The second end 20 of the first cable 16 is inserted into the second end 54 of the second passageway 50. The relief 58 provided adjacent the second end 54 of the second passageway 50 provides an enlarged opening to received the cable 16 and also provides a smooth transition such that the cable 16 is not in contact with a sharp edge when under tension. The second end 54 of the first cable 16 is further moved through the second passageway 50 and into the passageway 74 of the second wedge assembly 72 and engages the second plug 101. A minimum diameter of the passageway 74 of the second wedge assembly 72 is maintained such that the passageway 74 is able to receive the second end 20 of the first cable 16. The plug 101 may have an outer diameter larger than the diameter of the first cable 16 thereby allowing the passageway 74 of the second wedge assembly 72 to easily receive the first cable 16.

After engaging the second plug 101, the second end 20 of the first cable 16 is moved through the second passageway 50 of the body 42 thereby pushing the second plug 101 and removing the second plug 101 from the passageway 74 of the second wedge assembly 72. The second plug 101 is moved against the biasing force of the securing member 121. The securing member 121 may cut or broken as the plug 101 is removed from the wedge assembly 72. Further, the securing member 121 may remain within the passageway 50 of the body 42 as the cable 16 is moved through the passageway 50. The second end 20 of the first cable 16 is moved entirely through the second passageway 50 of the body 42 and past the first end 52 of the passageway 50. The second cable 22 can be inserted through the first passageway 44 of the body 42 in the same manner described above with respect to the first cable 16. An inner surface 31, 33 of the first and second wedge assemblies 60, 72 adjacent the passageways includes teeth (not shown) that engage the cables 16, 22 after being inserted through the passageways 62, 74 of the wedge assemblies 60, 72. The teeth of the wedge assemblies 60, 72 allow the cables 16, 22 to move from the second ends 48, 54 to the first ends 46, 52 of the passageways 62, 74, but engage and grip the cables 16, 22 when the cables are moved from the first ends 46, 52 to the second ends 48, 54 of the passageways 62, 74. The first and second cables 16, 22 can be tensioned by further pulling the second ends 20, 26 of the cables 16, 22 through the body 42. A tensioner machine or any other suitable device may be used to tension the cables 16, 22. The cables 16, 22 are tensioned and the wedge assemblies 60, 72 engage the respective cables 16, 22 with the respective tapered surfaces 68, 80 of the wedge assemblies 60, 72 engaging the respective tapered portions 84, 86 of the first and second passageways 44, 50 such that the wedge assemblies 60, 72 are squeezed by the tapered portions 68, 80 of the body 42 and tighten on the first and second cables 16, 22.

Referring to FIGS. 10-15, a further embodiment of a splice tube assembly 140 is disclosed. The splice tube assembly 140 of the present embodiment is similar to the splice tube assembly 40 described above and shown in FIGS. 2-9. Like reference numerals will be used for like elements. Rather than providing the securing members 111, 121 with the resilient bodies 113, 123 and cross members 119, 129 as shown in FIGS. 2-9, the splice tube assembly 140 includes a securing member 142 having a flexible body 144 with a first end 146 and a second end 148. The securing member 142 may a flexible wire, although other suitable securing members may also be used. When the splice tube assembly 140 is assembled, the first wedge assembly 60 is positioned within the first passageway 44 of the body 42 adjacent to the first end 46 of the first passageway 44 with the tapered surface 68 of the first wedge assembly 60 engaging the tapered portion 84 of the first passageway 44. The first plug 90 is positioned within the passageway 62 of the first wedge assembly 60. The second wedge assembly 72 and the second plug 101 are positioned within the second passageway 50 of the body 42 adjacent to the first end 52 of the second passageway 50 in the same manner described above in connection with the first wedge assembly 60 and first plug 90.

The first end 146 of the flexible body 144 extends through the passageway 94 of the first plug 90, through the passageway 62 of the first wedge assembly 60 and the first passageway 44 of the body 42, and further extending through the passageway 105 of the second plug 101, through the passageway 74 of the second wedge assembly 70 and the second passageway 50 of the body 42 and being secured to the second end 148 of the flexible body 144. The first and second ends 146, 148 of the flexible body 144 may be secured adjacent the first end 46 of the first passageway 44 and the second end 54 of the second passageway 50. Further, the first and second ends 146, 148 of the flexible body 144 may be secured to each other by twisting the ends together or tying the ends together, although other suitable arrangements for securing the ends may be used. Accordingly, the plugs 90, 101 are secured to the body 42 via the securing member 142 such that the plugs 90, 101 and the wedge assemblies 60, 72 cannot be easily separated from the body 42.

Figure 15:
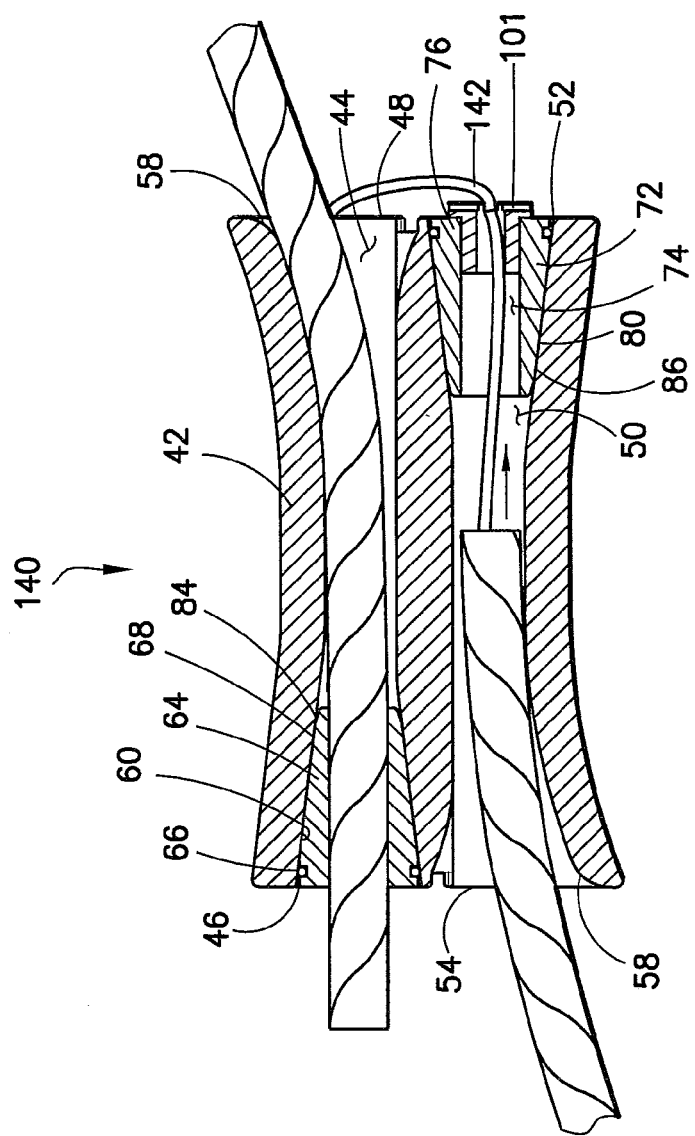
FIG. 15 is a cross-sectional view of the splice tube assembly shown in FIG. 10, showing the splice tube assembly with cables installed.

Referring to FIG. 15, the first cable 16 is shown being inserted into the second passageway 50 and the second cable 22 is shown extending through the first passageway 44. The first and second cables 16, 22 are installed within the splice tube assembly 140 in the same manner described above in connection with splice tube assembly 40. As the plugs 90, 101 are pushed by the cables 16, 22, the securing member 142 may include enough slack such that the plugs 90, 101 are free to move from the passageways 62, 74 of the wedge assemblies 60, 72. The securing member 142 may remain in the first and second passageways 44, 50 after the first and second cables 16, 22 are installed. The first and second cables 16, 22 may also be inserted into the respective first and second passageways 44, 50 of the body 42 and into the passageways 62, 74 of the respective wedge assemblies 60, 72 with the securing member 142 being cut or broken prior to engaging the plugs 90, 101 with the cables 16, 22.

While several embodiments were described in the foregoing detailed description, those skilled in the art may make modifications and alterations to these embodiments without departing from the scope and spirit of the invention. Accordingly, the foregoing description is intended to be illustrative rather than restrictive.

The invention claimed is:

1. A splice tube assembly comprising:
    a body defining first and second passageways extending through the body, each passageway having a first end and a second end;
    first and second wedge assemblies each having a passageway, at least a portion of the first and second wedge assemblies being positioned within the first and second passageways, respectively;
    first and second plugs at least partially positioned within the respective passageways of the first and second wedge assemblies; and
    a securing member that secures at least one of the first and second plugs to the body.

2. The splice tube assembly of claim 1, wherein the securing member engages the first and second plugs and the body thereby securing the position of the first and second plugs and the first and second wedge assemblies relative to the body.

3. The splice tube assembly of claim 1, wherein the securing member is a flexible wire having first and second ends, the first end of the flexible wire extending through a passageway defined in the first plug, through the passageway of the first wedge assembly and the first passageway of the body, and further extending through a passageway defined in the second plug, through the passageway of the second wedge assembly and the second passageway of the body and being secured to the second end of the flexible wire.

4. The splice tube assembly of claim 1, wherein the first and second passageways of the body each include a tapered portion, each of the wedge assemblies having a tapered surface configured to engage the tapered portion of the first and second passageways.

5. The splice tube assembly of claim 1, wherein the wedge assemblies each comprise a plurality of wedge pieces and a resilient member securing the wedge pieces to a position adjacent each other.

6. The splice tube assembly of claim 5, wherein an outer surface of the wedge assemblies defines an annular groove, the resilient member being positioned within the annular groove.

7. The splice tube assembly of claim 1, wherein each plug comprises:
    a plug body having a passageway extending therethrough; and
    a flange extending radially outward from the plug body, the flange being configured to engage an outer surface of the wedge assemblies.

8. The splice tube assembly of claim 7, wherein the body defines a groove positioned adjacent to the second end of the first passageway of the body.

9. The splice tube assembly of claim 8, wherein the securing member includes a resilient body having a first end and a second end, the first and second ends of the resilient body each having a cross member secured thereto, the securing member extending through the first passageway of the body with the cross member of the first end engaging the first plug and the cross member of the second end engaging the groove of the body.

10. The splice tube assembly of claim 9, wherein the securing member biases the first plug and the first wedge assembly from the first end of the body passageway towards the second end of the body passageway.

11. The splice tube assembly of claim 9, wherein the flange of the first plug defines a slot, the cross member of the first end of the resilient body engaging the slot of the flange of the first plug.

12. A method of securing wedge assemblies within a splice tube comprising:
    inserting a wedge assembly at least partially within a passageway defined by a splice tube;
    inserting a plug at least partially within a passageway defined by the wedge assembly; and
    securing the plug to the splice tube with a securing member.

13. The method of claim 12, wherein the securing member includes a first end and a second end, the plug being secured to the splice tube by inserting the first end of the securing member through a passageway defined in the plug, through the passageway of the wedge assembly and the passageway of the splice tube, and being secured to the second end of the securing member.

14. The method of claim 12, wherein the plug comprises:
    a plug body having a passageway extending therethrough; and
    a flange extending radially outward from the plug body, the flange being configured to engage an outer surface of the wedge assemblies, wherein the splice tube defines a groove positioned adjacent to an end of the passageway of the splice tube.

15. The method of claim 14, wherein the securing member includes a first end and a second end, the first and second ends of the securing member each having a cross member secured thereto, the plug and wedge assembly being secured relative to the splice tube by inserting the securing member through the passageway of the splice tube with the cross member of the first end engaging the plug and the cross member of the second end engaging the groove of the splice tube.

16. The method of claim 15, further comprising:
    biasing the plug and the wedge assembly within the passageway of the splice tube via the securing member.

17. The method of claim 6, further comprising:
    removing the plug from the passageway of the wedge assembly by inserting a cable through the passageway of the splice tube and engaging the plug.

* * * * *

UNITED STATES PATENT AND TRADEMARK OFFICE
CERTIFICATE OF CORRECTION

PATENT NO. : 8,567,016 B2  
APPLICATION NO. : 12/851000  
DATED : October 29, 2013  
INVENTOR(S) : John C. Stankus et al.

Page 1 of 1

It is certified that error appears in the above-identified patent and that said Letters Patent is hereby corrected as shown below:

In the Claims

Column 8, Line 61, Claim 17, delete "claim 6" and insert -- claim 16 --

Signed and Sealed this
Eighteenth Day of March, 2014

Michelle K. Lee
*Deputy Director of the United States Patent and Trademark Office*